No. 800,390. PATENTED SEPT. 26, 1905.
J. O'MEARA.
PIPE COUPLING.
APPLICATION FILED APR. 8, 1904.
Fig. 1.
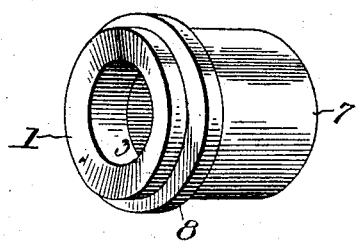
Fig. 2.
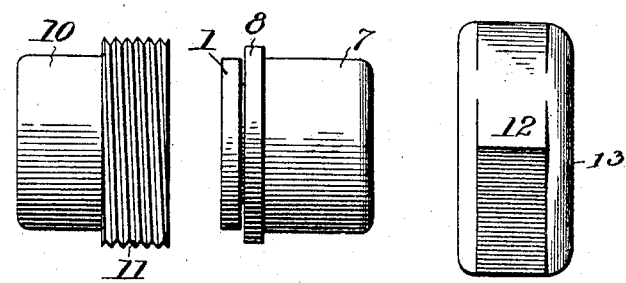
Fig. 3.
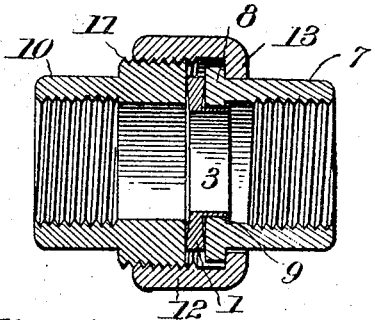
Fig. 4.    Fig. 5.
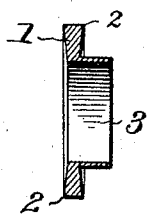 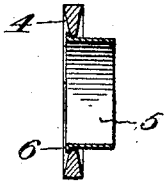
WITNESSES:
C. N. Walker.
E. A. Finckel.
INVENTOR
Jeremiah O'Meara
BY Wm. H. Finckel
Attorney

UNITED STATES PATENT OFFICE.

JEREMIAH O'MEARA, OF NEW YORK, N. Y.

PIPE-COUPLING.

No. 800,390. Specification of Letters Patent. Patented Sept. 26, 1905.

Application filed April 8, 1904. Serial No. 202,234.

*To all whom it may concern:*

Be it known that I, JEREMIAH O'MEARA, a citizen of the United States, residing at New York, in the county of New York and State of New York, have invented a certain new and useful Improvement in Pipe-Couplings, of which the following is a full, clear, and exact description.

The object of this invention is to provide an efficient fluid-tight union or coupling for pipes which are subjected to expansion and contraction through the influence of service.

The invention consists, essentially, of a washer of relatively soft metal, such as brass, of angular or other cross-section, which will present contact edges adapted to be fixed loosely to one member of the coupling, so as not to become detached in handling, and therefore always in position for use and capable of being compressed between the ends of the pipes as they are drawn together by the coupling-nut or other device, so as to make a fluid-tight joint, which is unaffected by the expansion and contraction incident to use.

The invention is specially useful in the distribution of high-pressure steam, oil, acids, and other fluids apt to cause expansion and contraction of the pipes, thereby resulting in leakage.

The invention is susceptible of embodiment in various forms; but only two variations are herein particularly described.

In the accompanying drawings, illustrating the invention, in the several figures of which like parts are similarly designated, Figure 1 is a perspective view of portion of a pipe coupling or union, showing the washer in position. Fig. 2 shows in elevation ready for assembling the several parts of a pipe coupling or union containing the washer of this invention. Fig. 3 is a longitudinal section of the coupling assembled. Fig. 4 is a cross-section of one form of washer. Fig. 5 is a cross-section of another form of washer.

The washer 1, Figs. 1 to 4, is an annulus of dovetail or other cross-section, angular or otherwise, so as to present contact edges 2 of less area than the width of the washer and capable of compression between adjacent pipes or coupling members, so as to provide for renewed tightening up of the joint before the full width of the washer is included in the compression. This annulus has an integral tubular extension 3, which may be spun or expanded in the pipe or coupling member, so as to attach the washer so fixedly to it as to retain it against accidental loss or detachment in handling and also so as to have it always in position and ready for use.

In Fig. 5 the annulus 4 and its tubular extension 5 are made as separate parts, and the two are connected by a flange 6 on the extension 5; otherwise this form of washer is the same in function and application as the washer first described.

Illustrating one form of coupling comprising the washer of this invention the coupling member 7 is internally screw-threaded to receive a pipe and has an external flange 8 and a slight shoulder 9 adjacent said flange. The washer is secured loosely or movably in member 7 by spinning or expanding its tubular member against the shoulder, as shown in Fig. 3. The complemental coupling member 10 has an internal screw-thread to engage a pipe and an externally-screw-threaded flange 11. The nut or uniting member 12 is flanged at 13 to engage the flange of the member 7 and is screw-threaded to engage the screw-threaded flange 11 of the member 10, so that by screwing up said nut the coupling members may be drawn toward each other with the washer between them. In the case of iron pipes or pipes of a material relatively harder than the washer the washer will be compressed between them, and thus it becomes, in effect, a packing, so that a fluid-tight joint is effected and one which is responsive to contraction and expansion without impairing the tightness of the joint; and, moreover, in case of leakage the joint may be tightened up by further turning of the nut within the limit of compressibility of the washer. A further advantage of the invention is that when the washer is made of brass or similar metal not readily oxidizable it constitutes an efficient preventive of pipes rusting together.

It will be observed that the washer of this invention has no function as a connecting member of itself considered, but that it is primarily and essentially a washer or packing.

What I claim is—

1. A pipe-coupling member, comprising a washer of soft metal having contact edges of less width than the area of the adjacent surfaces of the parts to be joined and capable of being compressed between said parts as they are drawn together to make the joint fluid-tight, said washer also having a tubular extension permanently expanded within one of the pipes and thereby movably but fixedly secured to said pipe so as to resist accidental detachment in handling the pipe.

2. A pipe-coupling member, comprising a washer of soft metal having contact edges of less width than the area of the adjacent surfaces of the parts to be joined and capable of being compressed between said parts as they are drawn together to make the joint fluid-tight, and a separately-formed tubular extension connected to said washer and permanently expanded within one of the pipes and thereby movably but fixedly secured to said pipe so as to resist accidental detachment in handling the pipe.

3. A pipe-coupling, comprising an externally-flanged and internally-shouldered member, an end washer of dovetail cross-section having a tubular extension permanently expanded within and against the shoulder of said member and thereby movably secured thereto against accidental displacement in handling, an externally-screw-threaded member and a flanged nut engaging the two members to draw them together and compress the washer between the flange of the flanged member and the end of the screw-threaded member.

In testimony whereof I have hereunto set my hand this 6th day of April, A. D. 1904.

JEREMIAH O'MEARA.

Witnesses:
M. F. CLARK,
M. T. CLARK.